(12) United States Patent
Arora et al.

(10) Patent No.: US 11,303,549 B2
(45) Date of Patent: Apr. 12, 2022

(54) SEGMENTED TRACEROUTE FOR SEGMENT ROUTING TRAFFIC ENGINEERING

(71) Applicant: Juniper Networks, Inc., Sunnyvale, CA (US)

(72) Inventors: Kapil Arora, Bangalore (IN); Samson P. Ninan, Bangalore (IN); Shraddha Hegde, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 94 days.

(21) Appl. No.: 16/946,961

(22) Filed: Jul. 13, 2020

(65) Prior Publication Data

US 2021/0367867 A1    Nov. 25, 2021

(30) Foreign Application Priority Data

May 22, 2020  (IN) .............................. 202041021550

(51) Int. Cl.
*H04L 12/26*    (2006.01)
*H04L 12/723*   (2013.01)
(Continued)

(52) U.S. Cl.
CPC .......... *H04L 43/0811* (2013.01); *H04L 45/50* (2013.01)

(58) Field of Classification Search
None
See application file for complete search history.

(56) References Cited

U.S. PATENT DOCUMENTS 7,463,591 B1 *  12/2008  Kompella ........... H04L 43/0811
                                              370/225
7,940,695 B1 *   5/2011  Bahadur ............... H04L 49/555
                                              370/254
(Continued)

FOREIGN PATENT DOCUMENTS

EP          3637693 A1    4/2020

OTHER PUBLICATIONS

RFC4379. Detecting Multi-Protocol Label Switched (MPLS) Data Plane Failures. Feb. 2006. (Year: 2006).*
(Continued)

*Primary Examiner* — Andre Tacdiran
(74) *Attorney, Agent, or Firm* — Shumaker & Sieffert, P.A.

(57) ABSTRACT

Techniques are described for selectively pinging certain devices along a segment routing label switched path (LSP) to detect failures in the segment routing LSP. For example, an ingress device comprises one or more processors operably coupled to a memory that are configured to: in response to a request to verify connectivity of a segment routing LSP, configure a FEC stack specifying a stack of segment routing labels for the segment routing LSP; for each of the one or more devices identified from the FEC stack: generate a respective MPLS connectivity request packet for a respective device identified from an outermost FEC of the FEC stack; send the MPLS connectivity request packet to the respective device; receive an MPLS connectivity response packet that verifies connectivity of the respective device; and in response, update the FEC stack by removing the outermost FEC of the FEC stack that identifies the respective device.

20 Claims, 5 Drawing Sheets

(51) Int. Cl.
*H04L 43/0811* (2022.01)
*H04L 45/50* (2022.01)

(56) References Cited

U.S. PATENT DOCUMENTS

| | | | | |
|---|---|---|---|---|
| 2014/0269422 A1* | 9/2014 | Filsfils | ............. | H04L 41/12 370/254 |
| 2015/0030026 A1* | 1/2015 | Kumar | ............. | H04L 43/0811 370/392 |
| 2018/0026880 A1* | 1/2018 | Nainar | ............. | H04L 45/26 370/389 |
| 2019/0097922 A1* | 3/2019 | Chakraborty | ......... | H04J 3/0638 |
| 2021/0328915 A1* | 10/2021 | Nainar | ............. | H04L 45/50 |

OTHER PUBLICATIONS

RFC6424. Internet Engineering Task Force (IETF) Mechanism for Performing Label Switched Path Ping (LSP Ping) over MPLS Tunnels. Nov. 2011. (Year: 2011).*
Juniper Networks. What is segment routing? https://www.juniper.net/US/en/research-topics/what-is-segment-routing.html. Accessed on Dec. 2, 2021. (Year: 2021).*
Extended Search Report from counterpart European Application No. 20199623.8, dated Mar. 25, 2021, 7 pp.
Gredler et al., "North-Bound Distribution of Link-State and Traffic Engineering (TE) Information Using BGP," nternet Engineering Task Force (IETF), RFC 7752, Mar. 2016, 49 pp.
Filsfils et al. "Segment Routing Use Cases" draft-filsfils-spring-segment-routing-use-cases-01, Network Working Group, Internet-Draft, Oct. 21, 2014, 35 pp.
Filsfils et al., "Segment Routing Architecture," Internet Engineering Task Force (IETF), RFC 8402, Jul. 2018, 33 pp.
Filsfils et al., "Segment Routing Architecture draft-filsfils-spring-segment-routing-04," Internet-Draft, Network Working Group, Jul. 3, 2014, 18 pp.
Filsfils et al., "Segment Routing with MPLS data plane" draft-filsfils-spring-segment-routing-mpls-03, Internet-Draft, Network Working Group, Jul. 31, 2014, 14 pp.
Previdi et al., "Source Packet Routing in Networking (SPRING) Problem Statement and Requirements," RFC 7855, Internet Engineering Task Force, IETF, May 2016, 19 pp.
Kompella et al., "Detecting Multiprotocol Label Switched (MPLS) Data-Plane Failures," RFC 8029, Internet Engineering Task Force (IETF), Mar. 2017, 79 pp.
Kumar et al.," Label Switched Path (LSP) Ping/Traceroute for Segment Routing (SR) IGP-Prefix and IGP-Adjacency Segment Identifiers (SIDs) with MPLS Data Planes," RFC 8287, Internet Engineering Task Force (IETF), Dec. 2017, 26 pp.
Arora et al. "TTL Procedures for SR-TE Paths in Label Switched Path Traceroute Mechanisms" draft-arora-mpls-spring-ttl-procedures-srte-paths-01, Internet Draft, Routing Area, Feb. 21, 2019, 10 pp.
Hegde et al. "PMS/Head-end based MPLS Ping and Traceroute in Inter-AS SR Networks" draft-ninan-spring-mpls-Inter-as-oam-01, Internet Draft, Routing Area, Jul. 5, 2019, 10 pp.
Gredler et al., "North-Bound Distribution of Link-State and Traffic Engineering (TE) Information Using BGP," Internet Engineering Task Force (IETF), RFC 7752, Mar. 2016, 49 pp.
Masseur et al., "Path Computation Element (PCE) Communication Protocol (PCEP)," RFC 5440, Network Working Group, Mar. 2009, 76 pp.
Enns et al., "Network Configuration Protocol (NETCONF)," RFC 6241, Internet Engineering Task Force, IETF, Jun. 2011, 113 pp.
Moy, "OSPF Version 2," Network Working Group, RFC 2328, Apr. 1998, 244 pp.
Coltun et al., "OSPF for IPv6," Network Working Group, RFC 5340, Jul. 2008, 95 pp.
Sheth et al., "OSPF Hybrid Broadcast and Point-to-Multipoint Interface Type," RFC 6845, Internet Engineering Task Force, IETF, Jan. 2013, 9 pp.
Oran, "OSI IS-IS Intra-domain Routing Protocol," RFC 1142, Network Working Group, Feb. 1990, 157 pp.
Lindem et al. "OSPFv3 Link State Advertisement (LSA) Extendibility" Internet Engineering Task Force (IETF), RFC 3362, Apr. 2018, 33 pp.
Li et al., "IS-IS Extensions for Traffic Engineering," Network Working Group, RFC 5305, Oct. 2008, 18 pp.

* cited by examiner

SEGMENTED TRACEROUTE FOR SEGMENT ROUTING TRAFFIC ENGINEERING

This application claims the benefit of IN Provisional Application No. 202041021550 filed May 22, 2020, the entire contents of which is herein incorporated by reference.

TECHNICAL FIELD

The invention relates to computer networks and, more particularly, to software utilities for determining the status of computer network connections.

BACKGROUND

A computer network is a collection of interconnected computing devices that can exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form.

Certain devices (i.e., nodes), such as routers, maintain routing information that describes routes through the network. A "route" can generally be defined as a path between two locations on the network. Upon receiving an incoming packet, the router examines information within the packet to identify the destination for the packet. Based on the destination, the router forwards the packet in accordance with the routing information.

Packet-based networks increasingly utilize label switching protocols for traffic engineering and other purposes. Multi-protocol label switching (MPLS) is a mechanism used to engineer traffic patterns within Internet protocol (IP) networks according to the routing information maintained by the routers in the networks. By utilizing MPLS protocols, label switching routers (LSRs) can forward traffic along a particular path, i.e., a label switched path (LSP), through a network to a destination device using labels prepended to the traffic. An LSP defines a distinct path through the network to carry MPLS packets from the source device to a destination device. Routers may employ segment routing techniques, such as by using a Source Packet Routing in Networking (SPRING) paradigm, to advertise network segments between nodes using an Interior Gateway Protocol (IGP) and build single or multi-hop tunnels within an IGP domain. To perform segment routing, an ingress router adds one or more labels in a label stack, e.g., a segment list, to a packet, and intermediate routers along the path remove labels from the label stack applied to the packet as the packet is forwarded through the network.

Various software utilities exist for identifying failed connectivity between two nodes of a network and for exploring network topology. One such utility, referred to as an LSP ping mechanism, is used to detect data plane failures in MPLS LSPs. LSP ping mechanism may include two modes: a ping mode for testing end-to-end connectivity of an LSP, and a traceroute mode for performing fault isolation. In the ping mode, an ingress router of an LSP tests connectivity to a remote device by sending an MPLS echo request packet to test the status of connectivity to the egress router of the LSP. If an MPLS echo reply packet is not received within a defined time period, connectivity to the egress router along the LSP is assumed to be down. In traceroute mode, the ingress router identifies a location of a fault in the LSP by tracing an MPLS echo request packet's path from the ingress router to the egress router. For example, the MPLS echo request packet is typically sent to the control plane of each transit router, which performs various checks that it is a transit router for the LSP. Each of the transit routers may return an MPLS echo reply indicating the functional connectivity of the LSP. If an MPLS echo reply packet is not received within a defined time period (e.g., a Time to Live (TTL) value), connectivity to the egress router along the LSP is assumed to be down.

SUMMARY

In general, this disclosure describes techniques for an ingress device, e.g., router, configured to selectively ping certain devices along a segment routing label switched path (LSP) to detect failures (e.g., data plane failures) in the segment routing LSP. For example, a network may be configured to establish a segment routing LSP through the network from an ingress device to an egress device. In segment routing, when the ingress router receives a packet, the ingress router typically assigns the packet to a forwarding equivalence class (FEC), encapsulates the packet with a segment routing label stack associated with the FEC, and forwards the packet on the segment routing LSP according to the segment routing label stack. An LSP ping mechanism may then be used within the network to test whether packets that belong to a particular FEC are actually transported to the egress router for the LSP associated with the FEC. In accordance with the techniques described herein, the ingress router operates according to an enhanced LSP ping mechanism that selectively pings certain devices along the segment LSP such that the ingress router receives a response from only the devices identified from the FEC stack rather than from each routing device positioned along the path taken by the segment routing LSP.

In one example, the ingress router or other device is configured to operate according to the techniques described herein to iteratively send an MPLS echo request packet to each router identified from a forwarding equivalence class (FEC) stack configured from the segment routing label stack rather than necessarily sending an MPLS echo request packet to every next hop router along the path, which may include intermediate routers or other network devices not participating in the particular segment routing LSP, i.e., network devices not identified in the segment routing label stack. The FEC stack in segment routing identifies one or more devices (e.g., segment endpoints) of participating routers and, as further described herein, may be used to identify the particular routers to verify along the path traversed by the segment routing LSP.

The ingress router selectively pings the particular segment routers by generating a Multiprotocol Label Switching (MPLS) connectivity request packet (e.g., MPLS echo request packet also referred to as an MPLS ping) including the FEC stack and a label stack to steer the MPLS echo request packet to a selected device identified from outermost FEC of the FEC stack for the segment routing LSP. The ingress router sends the MPLS echo request packet to the corresponding device and awaits an MPLS connectivity response packet (e.g., MPLS echo reply packet) from the respective device that verifies connectivity of the respective device for the segment routing LSP. In response to receiving the MPLS echo reply packet, the ingress router updates the FEC stack by removing the outermost FEC from the FEC stack and determines whether the updated FEC stack is empty. If the FEC stack is not empty, the ingress device sends a subsequent MPLS echo request packet including the updated FEC stack, and a label stack to steer the MPLS echo request packet to a respective device identified from the outermost FEC of the updated FEC stack. The ingress router repeats the process for each of the devices identified from the FEC stack until the FEC stack is empty. In this way, the ingress device (or other device) may selectively ping the devices operating as segment routers along a specific segment routing LSP without having to ping each next hop router along the path traversed by the segment routing LSP.

The techniques described in this disclosure may provide one or more technical advantages that realize a practical application. For example, by selectively pinging certain devices identified in a segment routing label stack, the ingress router receives responses only from the devices identified in the segment routing label stack, which reduces the load of the network, particularly in networks of large scale.

In one example, this disclosure is directed to a method comprising in response to a request to verify connectivity of a segment routing label switched path (LSP), configuring, by an ingress device of the segment routing LSP, a forwarding equivalence class (FEC) stack specifying a stack of segment routing labels for the segment routing LSP, wherein the FEC stack comprises information identifying one or more devices operating as segment endpoints along the segment routing LSP to be validated; and for each of the one or more devices identified from the FEC stack: generating, by the ingress device, a respective Multiprotocol Label Switching (MPLS) connectivity request packet for a respective device of the one or more devices, wherein the respective device is identified from an outermost FEC of the FEC stack; sending, by the ingress device, the MPLS connectivity request packet to the respective device; receiving, by the ingress device and from the respective device, an MPLS connectivity response packet that verifies connectivity of the respective device for the segment routing LSP; and in response to receiving the MPLS connectivity response packet, updating, by the ingress device, the FEC stack by removing the outermost FEC of the FEC stack that identifies the respective device.

In another example, this disclosure is directed to an ingress device of a segment routing label switched path (LSP) comprising: one or more processors operably coupled to a memory, wherein the one or more processors are configured to: in response to a request to verify connectivity of the segment routing LSP, configure a forwarding equivalence class (FEC) stack specifying a stack of segment routing labels for the segment routing LSP, wherein the FEC stack comprises information identifying one or more devices operating as segment endpoints along the segment routing LSP; and for each of the one or more devices identified from the FEC stack: generate a respective Multiprotocol Label Switching (MPLS) connectivity request packet for a respective device of the one or more devices, wherein the respective device is identified from an outermost FEC of the FEC stack; send the MPLS connectivity request packet to the respective device; receive, from the respective device, an MPLS connectivity response packet that verifies connectivity of the respective device for the segment routing LSP; and in response to receiving the MPLS connectivity response packet, update the FEC stack by removing the outermost FEC of the FEC stack that identifies the respective device.

In another example, this disclosure is directed to a non-transitory computer-readable medium comprising instructions for causing one or more programmable processors of an ingress device one to: in response to a request to verify connectivity of a segment routing label switched path (LSP), configure a forwarding equivalence class (FEC) stack specifying a stack of segment routing labels for the segment routing LSP, wherein the FEC stack comprises information identifying one or more devices operating as segment endpoints along the segment routing LSP; and for each of the one or more devices identified from the FEC stack: generate a respective Multiprotocol Label Switching (MPLS) connectivity request packet for a respective device of the one or more devices, wherein the respective device is identified from an outermost FEC of the FEC stack; send the MPLS connectivity request packet to the respective device; receive, from the respective device, an MPLS connectivity response packet that verifies connectivity of the respective device for the segment routing LSP; and in response to receiving the MPLS connectivity response packet, update the FEC stack by removing the outermost FEC of the FEC stack that identifies the respective device.

The details of one or more examples are set forth in the accompanying drawings and the description below. Other features, objects, and advantages will be apparent from the description and drawings, and from the claims.

DETAILED DESCRIPTION

Figure 1:
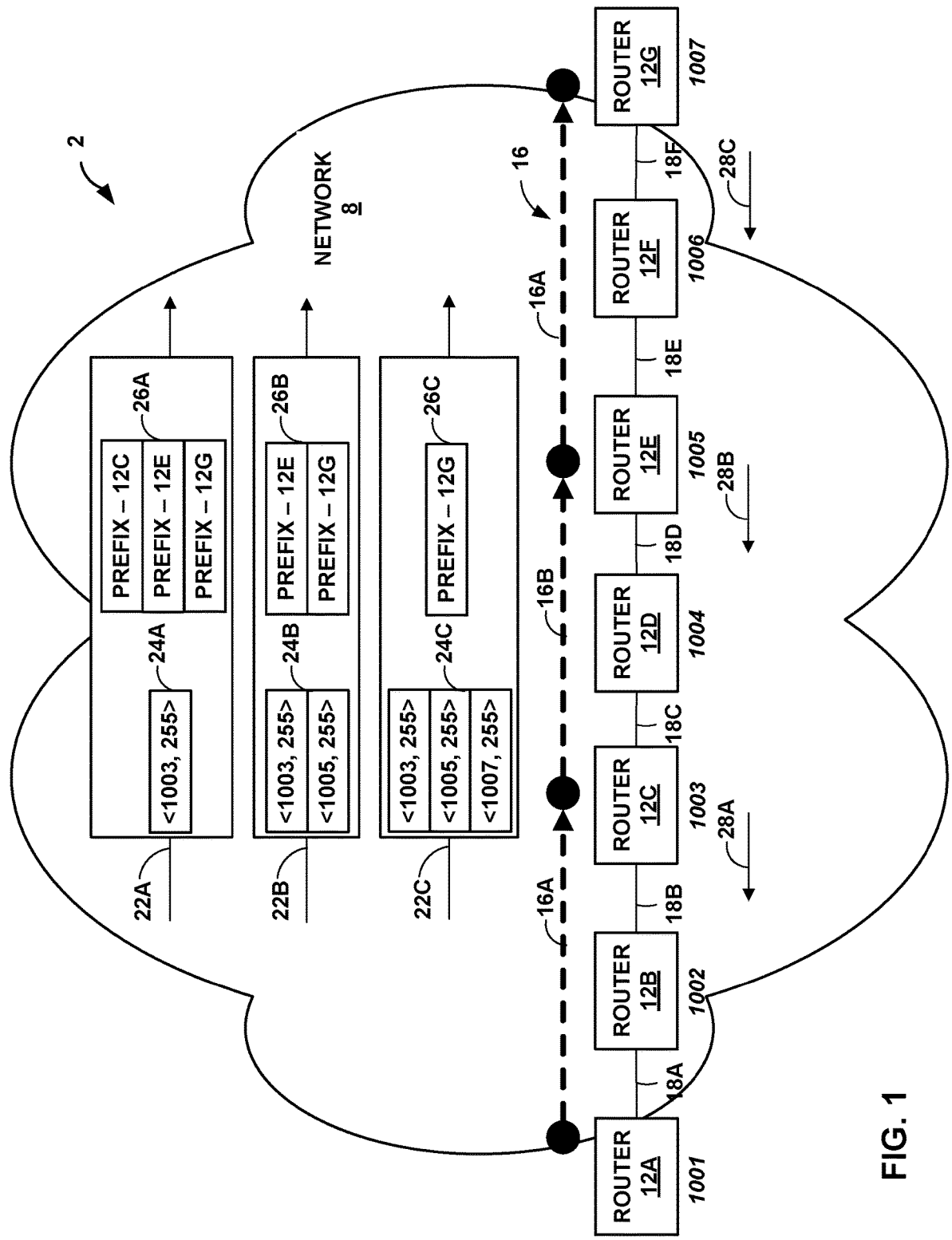
FIG. 1 is a block diagram illustrating an example network in which an ingress device selectively pings certain devices along a segment routing label switched path to detect failures in the segment routing label switched path, in accordance with the techniques described in this disclosure.

FIG. 1 is a block diagram illustrating an example network, in which an ingress device selectively pings certain devices along a segment routing label switched path (LSP) to detect failures (e.g., data plane failures) in the segment routing LSP, in accordance with the techniques described in this disclosure.

In the example of FIG. 1, network 2 includes a set of network devices, e.g., routers 12A-12G (collectively, "routers 12"), under common administrative control and that share a common routing protocol, such as an Interior Gateway Protocol (IGP) area or domain. Example IGPs include Intermediate System-Intermediate System (IS-IS) and Open Shortest Path First (OSPF). In the illustrated example of FIG. 1, router 12A is an ingress router to the IGP domain and router 12G is an egress router to the IGP domain. Routers 12B-12F operate as transit routers to forward traffic within the IGP domain. While described with respect to a router, the techniques may be implemented by any other type of network device having routing functionality, and need not necessarily be a dedicated routing device.

The sources of the network traffic received by ingress router 12A may comprise one or more devices (not shown) and/or any public or private network or the Internet that provides traffic to ingress router 12A in network 2. Furthermore, router 12G may, in this example, serve as an egress router of the IGP domain. The destinations of the network traffic being forwarded on LSPs may comprise one or more destination devices and/or network that may include local area networks (LANs) or wide area networks (WANs) that comprise a plurality of devices. For example, destination devices may include personal computers, laptops, workstations, personal digital assistants (PDAs), wireless devices, network-ready appliances, file servers, print servers or other devices that access the source via network 2.

In the example of FIG. 1, routers 12 may use segment routing techniques, such as a source packet routing in networking (SPRING) paradigm, to enable an ingress router to steer packets through a specific set of nodes and links in a network without relying on intermediate devices in the network to determine the path it should take. Routers 12 may use segment routing techniques to advertise segments between routers and build single or multi-hop tunnels within network 2. A first type of segment is an "adjacency segment" that represents a strict-forwarded, typically single-hop tunnel that carries packets over a specific link between a router and a specific node, irrespective of the link cost. A second example type of segment is a "prefix segment" that typically represents a multi-hop tunnel using least cost path links between a router and a specific address prefix.

In segment routing, the "path" information for segments is disseminated between the routers within an IGP domain as part of the IGP link state information for the domain. For example, the path information for the segments is disseminated or advertised between routers 12 using IGP (or to a controller device, such as a software defined networking (SDN) controller, using border gateway protocol link state (BGP-LS)). Ingress router 12A is able to steer a packet through an ordered list of instructions (i.e., segments) by prepending one or more segment identifiers (SIDs) to the packet, such as adjacency SIDs that identify adjacency segments and/or node SIDs that identify specific prefixes. In other words, ingress router 12A can steer a packet through a desired set of nodes and links by prepending the packet with an appropriate combination (stack) of SIDs. Segment routing allows routers to enforce a flow through any topological path and service chain while maintaining per-flow state only at the ingress node to each domain.

Segment routing can be directly applied to the Multi-Protocol Label Switching (MPLS) architecture with no change in the forwarding plane. A network administrator or centralized controller need only allocate SIDs to particular routers and the segment routing control plane architecture automatically builds the required MPLS forwarding constructs from a router to any other router. In some examples, a SID is encoded as an MPLS label, and an ordered list of SIDs is encoded as a stack of labels. The stack of SIDs is otherwise referred to herein as a "segment routing label stack." The SID of the segment to be processed is on the top of the label stack and, upon completion of a segment (i.e., when the packet reaches the endpoint of the segment), the related label is popped from the label stack as the packet is forwarded through the network.

Segment routing is further described in Filsfils et. al., "Segment Routing Architecture," Internet Engineering Task Force (IETF), Request for Comments (RFC 8402), July 2018, while Segment Routing use cases are described in Filsfils et. al., "Segment Routing Use Cases," Internet-Draft draft-filsfils-rtgwg-segment-routing-use-cases-01, July 2013, the entire contents of each of which are incorporated herein by reference. Further details regarding SPRING are found in (1) "Segment Routing Architecture," IETF draft: draft-filsfils-spring-segment-routing-04, Jul. 3, 2014; (2) S. Previdi, et al., "Source Packet Routing in Networking (SPRING) Problem Statement and Requirements," RFC 7855, May 201; and (3) "Segment Routing with MPLS data plane," IETF draft: draft-filsfils-spring-segment-routing-mpls-03, Aug. 1, 2014, the entire contents of each of which are incorporated by reference herein.

Further description of the establishment and use of prefix segments in network 2 is provided below as an illustrative example. Each of routers 12 may be associated with an address prefix. For instance, an administrator or controller may assign prefixes to one or more of routers 12. A prefix may be an address or block of addresses. The prefix corresponding to a router may comprise an Internet Protocol (IP) address (e.g., IPv4 or IPv6), a block of IP addresses, or another type of data identifying the router. Additionally, one or more of routers 12 may be configured with a segment identifier (SID) (i.e., label) associated with the prefix. In the example of FIG. 1, router 12A is configured with a SID of 1001, router 12B is configured with a SID of 1002, router 12C is configured with a SID of 1003, and so on.

A router in network 2 may advertise its prefix and SID to neighboring routers within the same domain of network 2. For example, routers 12 may use IGP to distribute the prefix and SIDs within the domain. When a router receives an advertisement, the router determines, from the router's link state database (LSDB) or traffic engineering database (TED), whether the prefix specified in the advertisement is already associated with the SID specified in the advertisement. If this is the case and if the advertisement represents a new best path, the router may update a routing table in response to the advertisement such that the routing table indicates a next hop in the route to the prefix. If the advertisement represents an equal cost compared to the existing route, the router may add an equal-cost multi-path (ECMP) next hop to the existing route.

If the advertisement specifies a prefix and a SID that is not already in the receiving router's LSDB or TED, the router may calculate a route to the prefix specified in the advertisement. In some examples, the router may calculate the route according to a shortest path algorithm or a strict shortest path algorithm. Furthermore, in some examples, an advertisement may specify the type of algorithm to use to calculate the route to the prefix specified in the advertisement. Additionally, the router may associate the SID specified by the advertisement with the calculated route to the prefix specified by the advertisement. In other words, the router may generate data that associates the SID with the route. The router may then install the route as an active route. Installing a route as an active route may comprise generating forwarding information that a forwarding component of the router may use to forward packets to next hops of routes associated with SIDS attached to the packets. For instance, installing the route as an active route may comprise generating information in a forwarding table that maps a SID to an interface card attached to a link to a next hop of the route associated with the SID.

When routers 12 receive a packet, routers 12 may determine whether a stack of one or more labels is attached to the packet. The stack of labels comprises an ordered sequence of labels. If the stack of labels still includes one or more labels, the router may determine a next hop or a route associated with the active label of the stack. The active label may be the label at the "top" of the stack. For instance, the active label may be the label occurring first in an ordered sequence of labels attached to the packet. If the next hop of the route associated with the active label advertised the active SID, the router (referred to as penultimate hop popping (PHP) router) may remove the active label from the stack of labels attached to the packet, potentially leaving one or more labels remaining attached to the packet. In other words, the router may "pop" the active label from the stack. The router may then forward the packet, along with the remaining labels of the stack, to a next hop on the route associated with the active label. This system may allow a source node, such as ingress router 12A, to control the path a packet takes through network 2.

If there is no stack of labels attached to the packet when the router receives the packet or if there are no remaining labels attached to the packet after the router removes the active label, the router forwards the packet to another node in network 2 without further use of segment routing. For instance, the router may forward the packet according to an IP address of the packet.

In the example of FIG. 1, routers 12 may steer packets along segment routing LSP 16 according to a segment routing label stack including labels 1003, 1005, and 1007 associated with router 12C, 12E, and 12G, respectively. For example, ingress router 12A encapsulates a packet including the segment routing label stack and forwards the packet to its next hop, e.g., router 12B. Since the next hop of router 12B is router 12C, router 12B removes active label, e.g., 1003, from the segment routing label stack and forwards the packet to router 12C. Router 12C forwards the packet to router 12D, which removes the active label, e.g., 1005, from the segment routing label stack and forwards the packet to router 12E. Router 12E then forwards the packet to router 12F, which removes the active label, e.g., 1007, from the segment routing label stack and forwards the packet to router 12G. Since there is no stack of labels attached to the packet, router 12G forwards the packet to another node in network 2 without further use of segment routing, e.g., according to an IP address of the packet.

When an ingress router receives a packet, the router assigns the packet to a forwarding equivalence class (FEC), encapsulates the packet with a segment routing label stack associated with the FEC, and forwards the packet on the segment routing LSP according to the segment routing label stack. The FEC represents packets that are forwarded through a network in the same manner, i.e., over the same path. A FEC can be identified by an address, tunnel, or class of service (CoS). Typically, a device assigns the same label to a FEC. The label that is encapsulated to the packet is used to identify the FEC to which the packet is assigned.

In some examples, routers 12 may use an LSP ping mechanism to test whether packets that belong to a particular FEC actually end on an egress router for the LSP associated with the FEC. The LSP ping mechanism typically includes two test modes: basic connectivity check ("ping") and fault isolation ("traceroute"). In a "ping" (basic connectivity check) mode, an MPLS connectivity request packet (e.g., MPLS echo request packet) is typically sent to an egress router of an LSP to test end-to-end connectivity to the egress router. For example, an ingress router of an LSP typically sends an MPLS echo request packet to the egress router. In response to receiving the MPLS echo request packet, the egress router sends the packet to its control plane. The egress router then verifies whether it is an egress for the LSP and sends an MPLS connectivity response packet (e.g., MPLS echo reply packet) indicating the functional connectivity of the LSP. If an MPLS echo reply packet is not received within a defined time period (e.g., a Time to Live (TTL) value), connectivity to the egress router along the LSP is assumed to be down.

In a "traceroute" (fault isolation) mode, the ingress router identifies the location of a fault in the LSP by tracing the path of an MPLS echo request packet from the ingress router to the egress router. For example, the MPLS echo request packet is typically sent to the control plane of each transit device, which performs various checks that it is a transit device for the LSP. Each transit device in the LSP may also return information that helps check the control plane against the data plane, i.e., that forwarding data structures and operation match what the routing protocols determined as the LSP.

An LSP ping mechanism uses a FEC stack that includes information identifying a FEC to be validated. For each label in a label stack, relevant FEC information is included in the FEC stack for validation. The FEC information of the FEC stack may include one or more prefixes such as a Label Distribution Protocol (LDP) prefix (IPv4 or IPv6), Resource Reservation Protocol (RSVP) IP session (IPv4 or IPv6), Virtual Private Network (VPN) prefix (IPv4 or IPv6), generic IP prefix (IPv4 or IPv6), Nil FEC, IPv4 IGP-Prefix segment identifier, IPv6 IGP-Prefix segment identifier, IGP-Adjacency segment identifier, and the like.

Further description of LSP ping mechanisms are described in K. Kompella, et al., "Detecting Multiprotocol Label Switched (MPLS) Data-Plane Failures," IETF, RFC 8029, March 2017; N. Kumar, et. al., "Label Switched Path (LSP) Ping/Traceroute for Segment Routing (SR) IGP-Prefix and IGP-Adjacency Segment Identifiers (SIDs) with MPLS Data Planes," IETF, RFC 8287, December 2017; and K. Arora, et al., "TTL Procedures for SR-TE Paths in Label Switched Path Traceroute Mechanisms," draft-arora-mpls-spring-ttl-procedures-srte-paths-01, Internet-Draft, Feb. 21, 2019, the entire contents of each of which is incorporated by reference herein.

Without the techniques described herein, the ingress router typically sends an MPLS echo request packet to each router along a path of the segment LSP and receives a response from each of the routers, even for routers that are not operating as segment endpoints for the segment LSP. As the size of the network increases, the ingress router receives an increasing number of MPLS echo reply packets, which increases the load on the network.

In accordance with the techniques described in this disclosure, the ingress router, e.g., router 12A (referred to as "ingress router 12A"), may selectively ping certain routers along a segment routing LSP to detect failures (e.g., data plane failures) in the segment routing LSP without necessarily sending an MPLS ping to each router along the path traversed by the segment routing LSP.

In the example of FIG. 1, assume that network 2 is configured with segment routing LSP 16 having three segments 16A, 16B and 16C with a segment routing label stack including respective labels for each router operating as a segment endpoint, e.g., routers 12C, 12E, and 12G, along the segment routing LSP. To check connectivity to each of routers 12C, 12E, and 12G and without receiving a response from each of the routers in segment routing LSP 16, ingress router 12A may, in response to receiving a request to verify connectivity of segment routing LSP 16 (e.g., via an interface of ingress router 12A or controller), configure a FEC stack including information identifying the routers of the segment routing label stack and iteratively sends an MPLS echo request packet to each of routers 12C, 12E, and 12G identified from the FEC stack. In the example of FIG. 1, ingress router 12A may send a first MPLS connectivity request packet, e.g., MPLS echo request packet 22A, including a first label stack 24A including a first label corresponding to a device identified from the outermost FEC of the FEC stack, e.g., 1003 associated with router 12C, and a FEC stack 26A with information associated with routers identified from the segment routing label stack, e.g., routers 12C, 12E, and 12G. In these examples, ingress router 12A includes a Time-to-Live (TTL) value (e.g., default is 255) for labels of the label stack. In the example of FIG. 1, ingress router 12A sends MPLS echo request packet 22A with a first label 24A as <1003, 255>, and FEC stack 26A including prefix segment identifiers of routers 12C, 12E, and 12G.

Router 12B, operating as the penultimate hop popping (PHP) router for router 12C, pops the active label (e.g., first label 24A) from the label stack of MPLS echo request packet 22A and forwards the MPLS echo request packet 22A via its interface directly connected to router 12C. In response to receiving the MPLS echo request packet 22A, router 12C may send the packet to its routing engine to verify that router 12C is a segment endpoint for segment routing LSP 16 associated with the FEC. In some examples, router 12C may send the packet to its routing engine if MPLS echo request packet 22A includes a routing alert (RA) object in the IP options.

Router 12C validates the outermost FEC of FEC stack 26A, e.g., prefix associated with router 12C, and, if verified, sends a first MPLS echo reply packet, e.g., MPLS echo reply packet 28A, to ingress router 12A to indicate router 12C is indeed a segment endpoint for segment routing LSP 16 associated with the FEC. In response to receiving MPLS echo reply packet 28A, ingress router 12A updates the FEC stack, for example, by removing the outermost FEC of FEC stack 26A (e.g., prefix associated with router 12C), which leaves prefix segment identifiers associated with routers 12E and 12G in the FEC stack (illustrated in FIG. 1 as FEC stack "26B").

Ingress router 12A sends a second MPLS echo request packet, e.g., MPLS echo request packet 22B, including a second label stack 24B with the first label (e.g., 1003 associated with router 12C) and a second label corresponding to a device identified from the outermost FEC of the updated FEC stack, e.g., 1005 associated with router 12E, and the FEC stack 26B with information associated with routers 12E and 12G. In the example of FIG. 1, ingress router 12A may send MPLS echo request packet 22B with a first label as <1003, 255> and a second label as <1005, 255>, and FEC stack 26B including prefix segment identifiers of routers 12E and 12G.

Router 12B, operating as the PHP router for router 12C, pops the active label (e.g., first label) and forwards the MPLS echo request packet 22B to router 12C. In this example, the second label <1005, 255> becomes the active label for MPLS echo request packet 22B. Router 12C then forwards MPLS echo request packet 22B to router 12D. Router 12D, operating as the PHP router for router 12E, pops the active label (e.g., second label) and forwards the MPLS echo request packet 22B to router 12E. In response to receiving the MPLS echo request packet 22B, router 12E may send the packet to its routing engine (e.g., if MPLS echo request packet 22B includes a routing alert object in IP options) to verify that router 12E is a segment endpoint for segment routing LSP 16 associated with the FEC.

Router 12E validates the outermost FEC of FEC stack 26B, e.g., prefix associated with router 12E, and sends a second MPLS echo reply packet, e.g., MPLS echo reply packet 18B, to ingress router 12A to indicate router 12E is indeed a segment endpoint for segment routing LSP associated with the FEC. In response to receiving MPLS echo reply packet 28B, ingress router 12A updates the FEC stack, for example, by removing the outermost FEC of FEC stack 26B, e.g., prefix associated with router 12E, which leaves a prefix associated with router 12G in the FEC stack (illustrated in FIG. 1 as FEC stack "26C").

Ingress router 12A sends a third MPLS echo request packet, e.g., MPLS echo request packet 22C, including a third label stack 24C with the first label (e.g., 1003 associated with router 12C), the second label (e.g., 1005 associated with router 12E), and a third label corresponding to a device identified from the outermost FEC of the updated FEC stack, e.g., 1007 associated with router 12G, and the FEC stack 26C with information associated with router 12G. As one example, ingress router 12A may send MPLS echo request packet 22C with a first label as <1003, 255>, a second label as <1005, 255>, and a third label as <1007, 255>, and FEC stack 26C including a prefix of router 12G.

Router 12B, operating as the PHP router for router 12C, pops the active label (e.g., first label) and forwards the MPLS echo request packet 22C to router 12C. In this example, the second label <1005, 255> becomes the active label for MPLS echo request packet 22C. Router 12C then forwards MPLS echo request packet 22C to router 12D. Router 12D, operating as the PHP router for router 12E, pops the active label (e.g., second label) and forwards the MPLS echo request packet 22C to router 12E. In this example, the third label <1007, 255> becomes the active label for MPLS echo request packet 22C. Router 12E then forwards MPLS echo request packet 22C to router 12F. Router 12F, operating as the PHP router for router 12G, pops the active label (e.g., third label) and forwards the MPLS echo request packet 22C to router 12G. In response to receiving the MPLS echo request packet 22C, router 12G may send the packet to its routing engine (e.g., if MPLS echo request packet 22C includes a routing alert object in IP options), to verify that router 12G is a segment endpoint for segment routing LSP 16 associated with the FEC.

Router 12G validates the outermost FEC of FEC stack 26C, e.g., 1007 associated with router 12G, and sends a third MPLS echo reply packet, e.g., MPLS echo reply packet 28C, to ingress router 12A to indicate router 12G is indeed a segment endpoint for segment routing LSP 16 associated with the FEC. In response to receiving MPLS echo reply packet 28C, ingress router 12A removes the last FEC of FEC stack 26C (e.g., prefix associated with router 12E), which signals to ingress router 12A that the LSP ping mechanism is complete and verifies connectivity for segment routing LSP 16 associated with the FEC.

Figure 2:
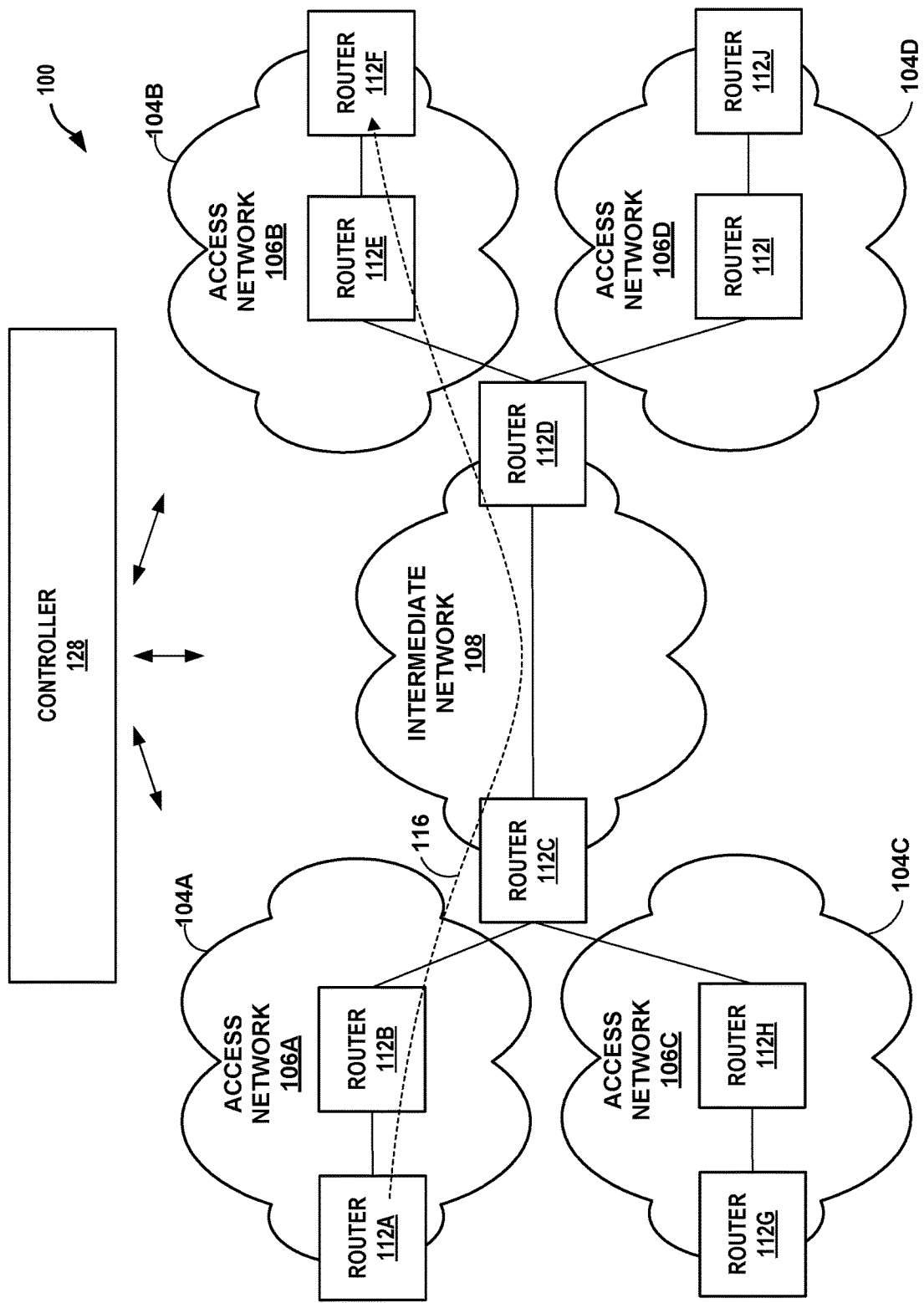
FIG. 2 is a block diagram illustrating another example network in which an ingress device selectively pings certain devices along a segment routing label switched path to detect failures in the segment routing label switched path, in accordance with the techniques described in this disclosure.

FIG. 2 is a block diagram illustrating another example network in which an ingress device selectively pings certain routers along a segment routing LSP to detect failures (e.g., data plane failures) in the segment routing LSP. In the example of FIG. 2, network 100 includes access networks 106A-106D (collectively, "access networks 106") connected via an intermediate network, e.g., intermediate network 108. Intermediate network 108 may represent a service provider network that is owned and operated by a service provider, which is usually a large telecommunications entity or corporation. Intermediate network 108 represents a layer 3 (L3) computer network, where reference to a layer followed by a number refers to a corresponding layer in the Open Systems Interconnection (OSI) model. Intermediate network 108 is a layer 3 network in the sense that it natively supports L3 operations as described in the OSI model. Common L3 operations include those performed in accordance with L3 protocols, such as the Internet protocol (IP). L3 is also known as a "network layer" in the OSI model and the "IP layer" in the TCP/IP model, and the term L3 may be used interchangeably with the phrase "network layer" and "IP" throughout this disclosure. Intermediate network 108 may also be referred to in this disclosure as a "core" network.

Intermediate network 108 may be coupled to one or more networks administered by the provider of intermediate network 108 or other providers, and may thus form part of a large-scale public network infrastructure, e.g., the Internet. Consequently, access networks 106 may be viewed as edge networks of the Internet. Intermediate network 108 may provide computing devices of access networks 106 with access to the Internet, and may allow the computing devices within access networks 106 to communicate with each other.

As illustrated in FIG. 2, network 100 may be partitioned into multiple IGP domains or areas 104. For instance, network 100 includes four domains, 104A-104D (collectively, "domains 104"). In some examples, domains 104 may each comprise an Interior Gateway Protocol (IGP) domain or area that includes a set of routers under common administrative control and that share a common routing protocol. Example IGPs include Intermediate System-Intermediate System (IS-IS) and Open Shortest Path First (OSFP). In this example, routers 112A-112B belong to domain 104A, routers 112E-112F belong to domain 104B, routers 112G-112H belong to domain 104C, and routers 112I-112J belong to domain 104D. In the illustrated example of FIG. 2, routers 112 comprise border routers at the edge and between the different domains, such as routers 12C and 12D. Area border routers 12C and 12D include interfaces attached to multiple areas. For example, router 12C includes interfaces attached to domains 104A and 104C, and router 12D includes interfaces attached to domains 104B and 104D. Although not shown in FIG. 2, each of domains 104 include one or more other network devices that operate as transit routers or switches to forward traffic within the respective domains and between border routers.

As illustrated in FIG. 2, network 100 includes a controller device 128, which may operate as a software defined networking (SDN) controller or other centralized controller that provides control plane operations and management for routers and other network devices within one or more of domains 104. For purposes of explanation, controller device 128 is described herein as providing control plane operations and management for at least domain 104A and domain 104B. In other examples, each of domains 104 may include a designated, centralized controller.

As illustrated, router 112A serves as an ingress router of inter-domain segment routing LSP 116, and hence, may be referred to in this disclosure as ingress router 112A. Similar to the example described in FIG. 1, the sources of inter-domain segment routing LSP 116 received by ingress router 112A may comprise one or more devices (not shown) and/or any public or private network or the Internet that provides traffic to ingress router 112A in network 100. Furthermore, in some examples, router 112F serves as an egress router of inter-domain segment routing LSP 116, and hence, may be referred to in this disclosure as egress router 112F.

Similar to the example described in FIG. 1, routers 112 may use segment routing techniques, e.g., a SPRING paradigm, to advertise segments between nodes using an IGP or BGP and build a single or multi-hop tunnels within each domain 104. Traditionally, an inter-domain segment routing LSP is constructed as a list of segment identifiers, including binding segment identifiers (BSIDs) of intra-domain LSPs. A binding segment represents a specific intra-domain tunnel between a router and a specific node or a specific address prefix. Nodes in a given domain typically do not store data describing nodes and routes within other domains, including prefixes and SIDs (e.g., node SIDs and/or binding SIDs). For instance, a router in a first IGP domain (e.g., domain 104A) does not typically store corresponding prefixes and SIDs for any other IGP domain (e.g., domain 104B), and thus does not have the FEC information used to test connectivity for an inter-domain segment routing LSP associated with the FEC.

In this example, routers 112 may advertise prefixes and SIDs to controller 128. For example, routers 112 may use border gateway protocol link state (BGP-LS) to disseminate path information within each of domains 104 to controller 128. In a controller-based inter-domain segment routing provisioning model, controller 128 programs the ingress router, e.g., ingress router 112A, with a list of SIDs used to establish the inter-domain segment routing LSP. For example, controller 128 may establish a configuration session, e.g., via path computation element protocol (PCEP), with ingress router 112A to send the ingress router the list of SIDs used to establish the inter-domain segment routing LSP.

In this way, controller 128 may provide ingress router 112A with the FEC information to enable ingress router 112A to selectively ping certain devices along inter-domain segment routing LSP 116 to detect failures (e.g., data plane failures) in inter-domain segment routing LSP 116, similar to the example described in FIG. 1.

Figure 3:
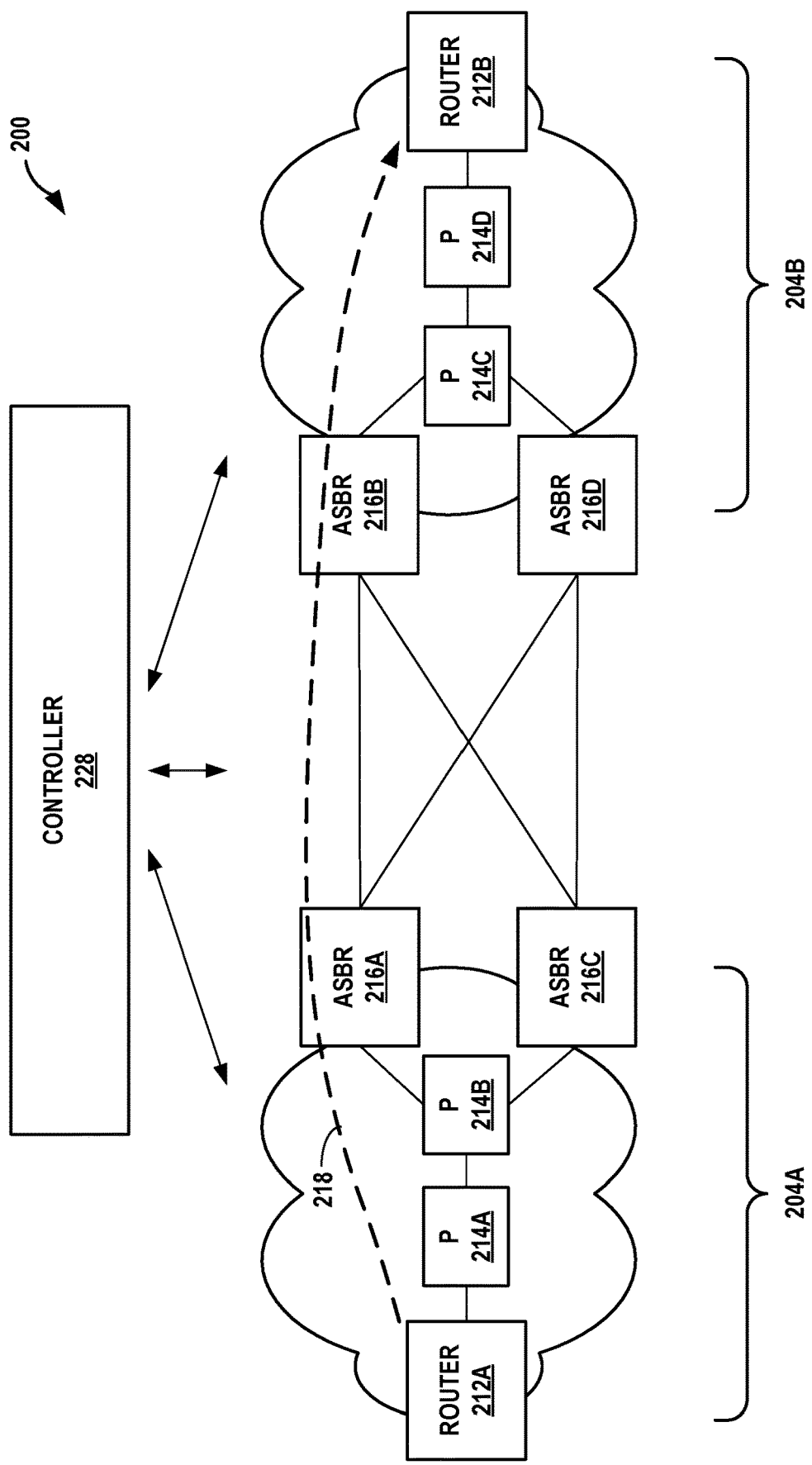
FIG. 3 is a block diagram illustrating another example network in which an ingress device selectively pings certain devices along a segment routing label switched path to detect failures in the segment routing label switched path, in accordance with the techniques described in this disclosure.

FIG. 3 is a block diagram illustrating another example network in which an ingress device selectively pings certain routers along a segment routing LSP to detect failures (e.g., data plane failures) in the segment routing LSP, in accordance with the techniques described in this disclosure. As illustrated in FIG. 3, network 200 includes autonomous systems 204A and 204B (collectively, "autonomous systems 204"). Each of autonomous systems 204 may comprise a set of routers under common administrative control and that share a common routing protocol. Each of autonomous systems 204 may comprise at least one border device that communicates with routers in other autonomous systems. In this example, autonomous system 204A includes router 212A, provider routers 214A-214B, and autonomous system border routers (ASBR) 216A-216B. Similarly, autonomous system 204B includes router 212B, provider routers 214C-214D, and ASBR 216B. Each of autonomous systems 204 may be owned or managed by a different service provider.

Similar to controller 128 of FIG. 2, controller 228 may operate as an SDN controller or other centralized controller that provides control plane operations and management for routers and other network devices within one or more of autonomous systems 204. Similar to the example described in FIG. 1, routers 212 may use segment routing techniques, e.g., a SPRING paradigm, to advertise segments between nodes using an IGP or BGP and build a single or multi-hop tunnels within each autonomous system 204. Traditionally, an inter-AS segment routing LSP is constructed as a list of segment identifiers (SIDs) of ASBRs 216 and routers 212. Because nodes in a given autonomous system typically do not store data describing nodes and routes within other autonomous systems, including prefixes and SIDs (e.g., node SIDs and/or binding SIDs), ingress router 212A may not have FEC information from other autonomous systems used to test connectivity for an inter-AS segment routing LSP associated with the FEC.

In this example, routers 212 and ASBRs 216 may advertise prefixes and SIDs to controller 228. For example, routers 212 and ASBRs 216 may use border gateway protocol link state (BGP-LS) to disseminate path information within each of autonomous systems 204 to controller 228. In a controller-based inter-AS segment routing provisioning model, controller 228 programs the ingress router, e.g., ingress router 212A, with a list of SIDs used to establish the inter-AS segment routing LSP 218. For example, controller 228 may establish a configuration session, e.g., via path computation element protocol (PCEP), with ingress router 212A to send the ingress router the list of SIDs used to establish the inter-AS segment routing LSP.

In this way, controller 228 may provide ingress router 212A with the FEC information to enable ingress router 212A to selectively ping certain devices along inter-AS segment routing LSP 218 to detect failures (e.g., data plane failures) in the inter-AS segment routing LSP 218, similar to the example described in FIG. 1. In these examples, the MPLS echo reply packet may use a reverse label stack as described in S. Hegde, et al., "PMS/Head-end based MPLS Ping and Traceroute in Inter-AS SR Networks," Internet-Draft, draft-ninan-spring-mpls-inter-as-oam-01," Jul. 5, 2019, the entire contents of which is incorporated by reference herein.

Figure 4:
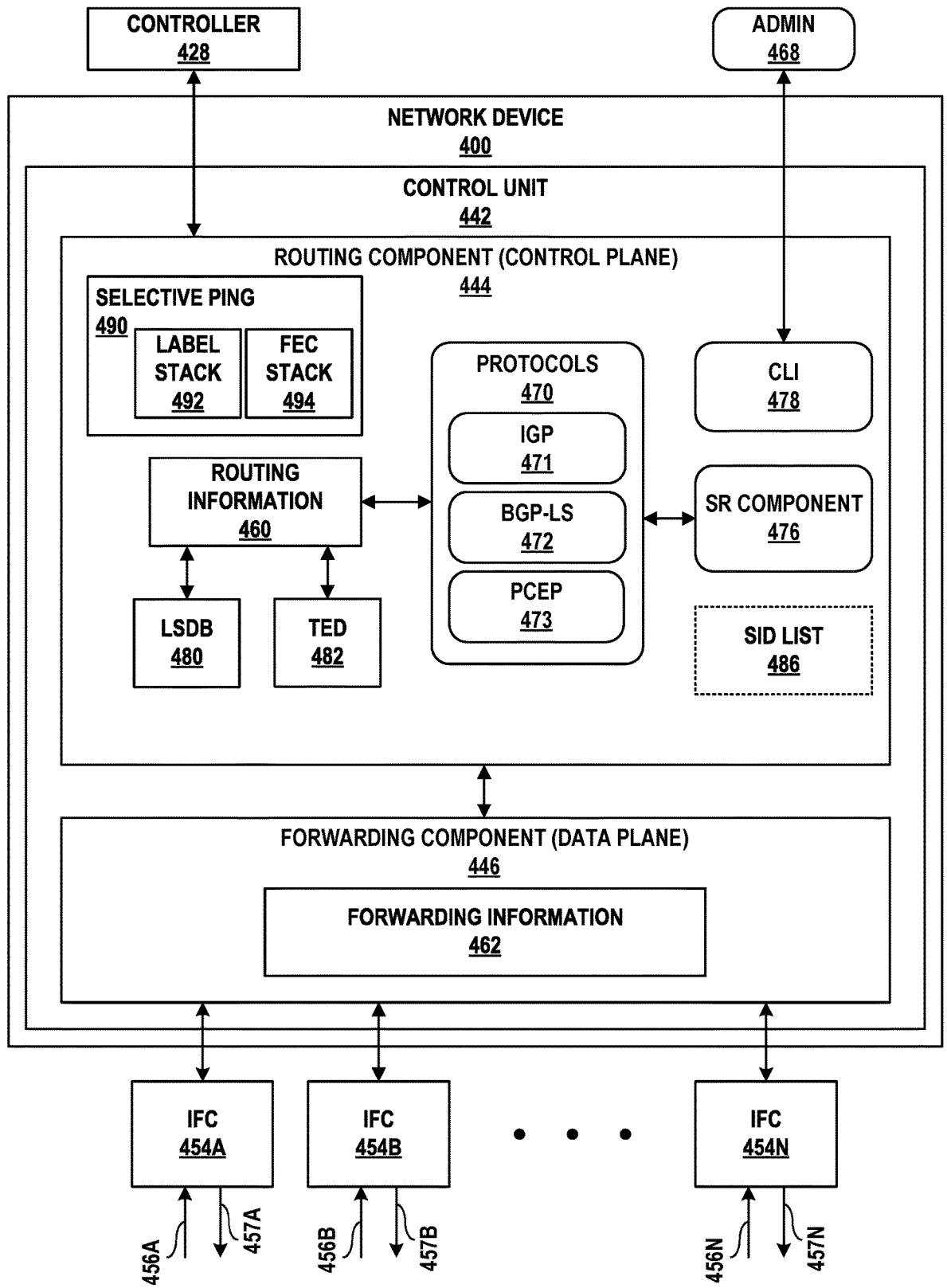
FIG. 4 is a block diagram illustrating an example of a network device, such as ingress router of FIG. 1, in accordance with the techniques described herein.

FIG. 4 is a block diagram illustrating an example network device 400 capable of operating in accordance with the techniques described herein. Network device 400 may represent any of ingress routers of FIGS. 1-3. While described with respect to a router, the techniques may be implemented by any other type of network device having routing functionality, and need not necessarily be a dedicated routing device.

In the example of FIG. 4, network device 400 includes interface cards 454A-454N ("IFCs 454") that receive and send data units, such as packet flows, via inbound links 456A-456N (collectively, "inbound links 456") and outbound links 457A-457N (collectively, "outbound links 457"), respectively. Network device 400 may include a chassis (not shown) having a number of slots for receiving a set of cards, including IFCs 454. Each card may be inserted into a corresponding slot of the chassis for electrically coupling the card to routing component 444 via high-speed switch (not shown), which may comprise, for example, switch fabric, switchgear, a configurable network switch or hub, or other high-speed switching mechanisms. IFCs 454 may be coupled to network links 456A-456N and 457A-457N via a number of physical interface ports (not shown). Generally, IFCs 454 may each represent one or more network interfaces by which network device 400 may interface with links of a network.

In general, network device 400 may include a control unit 442 that determines routes of received packets and forwards the packets accordingly via IFCs 454. In the example of FIG. 4, control unit 442 includes routing component (control plane) 444 that configures and controls packet forwarding operations applied by forwarding component (data plane) 446.

Routing component 444 provides an operating environment for various routing protocols 470 that execute at different layers of a network stack. Routing component 444 is responsible for the maintenance of routing information 460 to reflect the current topology of a network and other network entities to which network device 400 is connected. In particular, routing protocols periodically update routing information 460 to accurately reflect the topology of the network and other entities based on routing protocol messages received by network device 400. The protocols may be software processes executing on one or more processors. For example, routing component 444 includes network protocols that operate at a network layer of the network stack, which are typically implemented as executable software instructions.

In the example of FIG. 4, protocols 470 may include IGP 471 to exchange link state information, and facilitate forwarding of packets or other data units between routers within a routing domain. In some examples, IGP 471 may include an OSPF routing protocol in accordance with one or more of the RFC 2328, by J. Moy, entitled "OSPF Version 2," dated April 1998, RFC 5340, by R. Coltun et al. entitled "OSPF for IPv6," dated July 2008, RFC 6845, by N. Sheth et al., entitled "OSPF Hybrid Broadcast and Point-to-Multipoint Interface Type," dated January 2013, and RFC 8362, by A. Lindem et al., entitled "OSPFv3 Link State Advertisement (LSA) Extendibility," dated April 2018. In some examples, IGP 471 may include an IS-IS routing protocol that implements an IGP for exchanging routing and reachability information within a routing domain in accordance with RFC 1142, by D. Oran, entitled "OSI IS-IS Intra-domain Routing Protocol," dated February 1990 (republication of ISO/IEC 10589, last updated November 2002). IGP 471 may include IS-IS extensions that support traffic engineering, as described in RFC 5305, by T. Li et al., entitled "IS-IS Extensions for Traffic Engineering," dated October 2008. In some examples, network device 400 may include both an OSPF component and an IS-IS component.

In some examples, protocols 470 may, alternatively or additionally, include border gateway protocol link state (BGP-LS) 472 to exchange traffic engineering and segment routing policy information with controller 228. The BGP-LS protocol is described in additional detail in H. Gredler, et al., "North-Bound Distribution of Link-State and Traffic Engineering (TE) Information using BGP," Internet Engineering Task Force (IETF) RFC 7752, March 2016, the entire contents of which are incorporated herein by reference.

Protocols 470 may also include configuration protocols. For example, protocols 470 may include PCEP 473 in accordance with RFC 5440, by JP. Vasseur, Ed., et al, entitled "Path Computation Element (PCE) Communication Protocol (PCEP)," dated March 2009, or NETCONF (not shown) in accordance with RFC 6241, by R. Enns, Ed., et al., entitled "Network Configuration Protocol (NETCONF)," dated June 2011. In some examples where network device 400 comprises an ingress router for an inter-domain segment routing LSP or inter-AS segment routing LSP, controller device 428 (e.g., such as controller device 128 of FIG. 2 or controller device 228 of FIG. 3) may configure network device 400 with SID list 486 for a segment routing tunnel via PCEP 473 or a NETCONF component (not shown). Protocols 470 may include other routing protocols (not shown), such as Label Distribution Protocol (LDP), Resource Reservation Protocol with Traffic Extensions (RSVP-TE), routing information protocol (RIP), or other network protocols.

Routing component 444 includes a link state database (LSDB) 480 for storing domain topology information including SIDs and labels for provisioned segments, e.g., adjacency segments, prefix segments, and/or binding segments. The contents of LSDB 480 are maintained in accordance with an IGP 473 and have the scope of a single routing domain. Routing component 444 further includes Traffic Engineering Database 482 that augments LSDB 480 with traffic engineering link attributes. Each of LSDB 480 and TED 482 may be in the form of a variety of data structures, such as a number of tables, link lists, radix trees, databases, flat files, or other data structures.

Routing component 444 includes a segment routing (SR) component 476 to implement segment routing techniques that specify how network device 400 may provision and advertise SIDs for adjacency segments and/or prefix segments. In some examples, segment routing component 476 of network device 400, operating as an ingress router, may use the SIDs in LSDB 480 or TED 482 to construct SID label stack that is stored in SID list 486. Alternatively, or additionally, network device 400 may receive SID list 486 from controller 228. Network device 400 may steer a packet through a network by prepending the packet header with the SID label stack from SID list 486.

By executing the routing protocols, routing component 444 identifies existing routes through the network and determines new routes through the network. Routing component 444 stores routing information 460 that includes, for example, known routes through the network. Forwarding component 446 stores forwarding information 462 that includes destinations of output links 257. Forwarding information 462 may be generated in accordance with routing information 460.

In accordance with the described techniques, network device 400 includes a selective ping component 490 configured to selectively ping certain devices along a segment routing LSP to detect failures (e.g., data plane failures) of the segment routing LSP. In this example, network device 400 operating as an ingress router (e.g., ingress router 12A of FIG. 1) may iteratively send an MPLS echo request packet to each of routers identified from a FEC stack configured from the segment routing label stack of the segment routing LSP.

For example, in response to receiving, e.g., via CLI 478, a request to verify connectivity of a segment routing LSP, selective ping component 490 may configure a FEC stack 494 specifying a stack of segment routing labels for the segment routing LSP. Selective ping component 490 may determine the segment routing label stack for the segment routing LSP from SID list 486. For ease of illustration, SID list 486 may, in this example, include a segment routing label stack including labels associated with routers 12C, 12E, and 12F, as described in FIG. 1. Selective ping component 490 may configure a FEC stack 494 including information associated with routers identified from SID list 486, e.g., routers 12C, 12E, and 12G.

Selective ping component 490 may generate an MPLS echo request packet including a label stack 492 including a first label corresponding to a device identified from the outermost FEC of FEC stack 494 (e.g., 1003 associated with router 12C), and the FEC stack 494 with information associated with routers identified from the segment routing label stack, e.g., 12C, 12E, and 12G.

Network device 400 may send the MPLS echo request packet on the segment routing LSP path via one of outgoing links 257 connected to a next-hop of the segment routing LSP. In response, network device 400 may receive an MPLS echo reply packet if router 12C is verified as a segment endpoint of the segment routing LSP. In this example, network device 400 may receive an MPLS echo reply packet via one of inbound links 256 and forwarding component 446 forwards the MPLS echo reply packet to selective ping component 490.

In response to receiving the MPLS echo reply packet, selective ping component 490 updates FEC stack 494, for example, by removing the outermost FEC of FEC stack 494 (e.g., prefix associated with router 12C), which leaves prefix segment identifiers associated with routers 12E and 12G in FEC stack 494.

Selective ping component 490 may determine if there are any prefix segment identifiers remaining in FEC stack 494. If FEC stack 494 includes at least one prefix, selective ping component 490 continues the LSP ping process for each of the next routers identified in FEC stack 494, e.g., routers 12E and 12G, until the FEC stack is empty. For example, selective ping component 484 may generate a subsequent MPLS echo request packet including an updated label stack including the previous label (e.g., 1003 associated with router 12C) and a subsequent label corresponding to a device identified from the outermost FEC of the updated FEC stack 494 (e.g., 1005 associated with router 12E), and the updated FEC stack with information associated with routers 12E and 12G. Network device 400 may send the subsequent MPLS echo request packet on the segment routing LSP path and, in response, receive an MPLS echo reply packet from router 12E. Selective ping component 490 updates FEC stack 494, for example, by removing the outermost FEC of FEC stack 494 (e.g., prefix associated with router 12E), which leaves prefix segment identifier associated with router 12G in FEC stack 494.

In the next iteration, selective ping component 490 may generate a subsequent MPLS echo request packet including an updated label stack including the previous labels (e.g., 1003 associated with router 12C and 1005 associated with router 12E) and a subsequent label corresponding to a device identified from the outermost FEC of the updated FEC stack 494 (e.g., 1007 associated with router 12G), and the updated FEC stack with information associated with router 12G. Network device 400 may send the subsequent MPLS echo request packet on the segment routing LSP path and, in response, receive an MPLS echo reply packet from router 12G. Selective ping component 490 updates FEC stack 494, for example, by removing the outermost FEC of FEC stack 494 (e.g., prefix associated with router 12G), which results in FEC stack 494 being empty. An empty FEC stack 494 signals to selective ping component 490 that the LSP ping mechanism is complete and that connectivity for the segment routing LSP is verified. In some examples, selective ping component 484 may generate an indication, e.g., via an interface, to a user to indicate the segment routing LSP has connectivity.

The architecture of network device 400 illustrated in FIG. 4 is shown for example purposes only. The techniques of this disclosure are not limited to this architecture. In other examples, network device 400 may be configured in a variety of ways. In one example, some of the functionally of control unit 442 may be distributed within IFCs 454. In another example, control unit 442 may comprise a plurality of packet forwarding engines operated as client routers.

Control unit 442 may be implemented solely in software, or hardware, or may be implemented as a combination of software, hardware, or firmware. For example, control unit 442 may include one or more processors that execute program code in the form of software instructions. In that case, the various software components/modules of control unit 442 may comprise executable instructions stored on a computer-readable storage medium, such as computer memory or hard disk.

Figure 5:
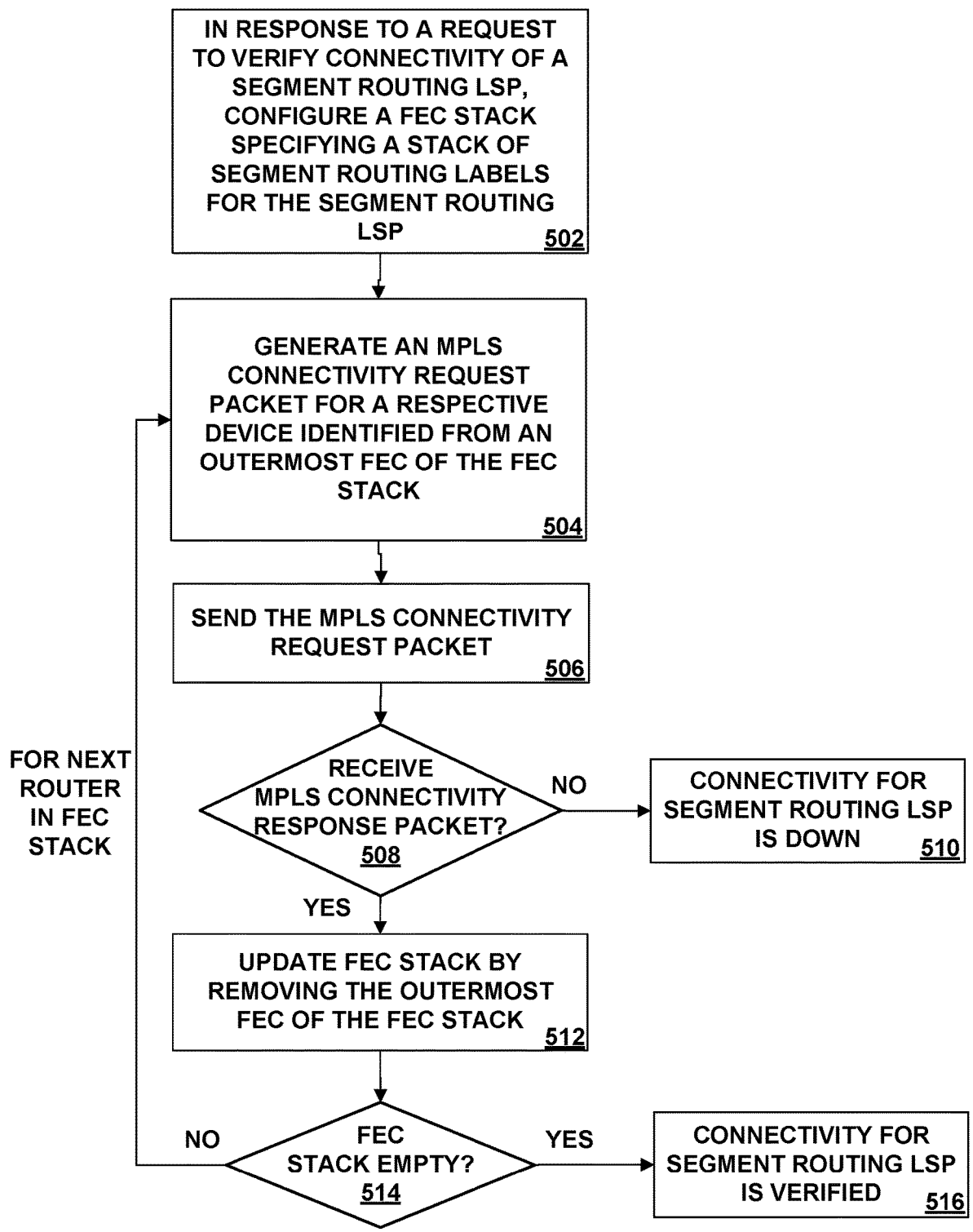
FIG. 5 is a flowchart illustrating an example operation of network, in accordance with the techniques described in this disclosure.

FIG. 5 is a flowchart illustrating an example operation of network 2, in accordance with the techniques described in this disclosure. For illustration purposes, FIG. 5 is explained with reference to ingress router 12 of FIG. 1 (or alternatively, ingress router 112 of FIG. 2 or ingress router 212 of FIG. 3).

In response to a request to verify connectivity of segment routing LSP 16, ingress router 12 configures a FEC stack specifying a stack of segment routing labels for the segment routing LSP. For example, ingress router 12A may receive, e.g., via CLI 478, a request to verify connectivity of segment routing LSP 16. In response, selective ping component 490 of ingress router 12A may determine a segment routing label stack for an established segment routing LSP, e.g., segment routing LSP 16. In the example described in FIG. 1, selective ping component 490 of ingress router 12 determines the segment routing label stack for segment routing LSP 16 includes labels associated with routers 12C, 12E and 12G. Selective ping component 490 configures a FEC stack including information (e.g., prefix segment identifiers) associated with routers 12C, 12E, and 12G.

Ingress router 12A may iteratively send an MPLS echo request packet to each router identified from the FEC stack configured from the segment routing label stack rather than necessarily sending an MPLS echo request packet to every next hop router along segment routing LSP 16. For example, ingress router 12 generates an MPLS connectivity request packet for a respective device identified from an outermost FEC of the FEC stack (504). For example, ingress router 12A may generate a first MPLS echo request packet, e.g., MPLS echo request packet 22A, including a first label stack 24A including a first label corresponding to the outermost FEC of the FEC stack, e.g., 1003 associated with router 12C, and a FEC stack 26A with information associated with routers identified from the segment routing label stack, e.g., routers 12C, 12E, and 12G. In these examples, ingress router 12A includes a TTL value (e.g., default is 255) for labels of the label stack. In this example, ingress router 12A generates MPLS echo request packet 22A with a first label 24A as <1003, 255>, and FEC stack 26A including prefix segment identifiers of routers 12C, 12E, and 12G.

Ingress router 12 sends the MPLS echo request packet to a next-hop corresponding to the segment routing LSP associated with the FEC stack (506). Router 12C of the FEC stack returns an MPLS connectivity response packet (e.g., MPLS echo reply packet 28A of FIG. 1) if router 12C is verified as a segment endpoint of the segment routing LSP.

Ingress router 12A determines whether ingress router 12A receives an MPLS connectivity response packet (e.g., MPLS echo reply packet 24A) (508). If ingress router 12A does not receive an MPLS echo reply packet ("NO" of step 508), ingress router 12A determines the segment routing LSP is down (510). If ingress router 12A receives an MPLS echo reply packet ("YES" of step 508), ingress router 12A updates the FEC stack by removing the outermost FEC from the FEC stack (512). For example, ingress router 12A updates the FEC stack by removing the prefix associated with router 12C, which is the outermost FEC of the FEC stack. In this example, the updated FEC stack includes prefix segment identifiers associated with routers 12E and 12G in the FEC stack (e.g., FEC stack 26B of FIG. 1).

Ingress router 12A may determine if there are any prefix segment identifiers remaining in the updated FEC stack, i.e., whether the FEC stack is empty (514). In this example, the FEC stack includes at least one prefix (e.g., prefix segment identifiers associated with routers 12E and 12G). In response to determining that at least one prefix remains in the FEC stack ("NO" of step 514), ingress router 12A generates (504) and sends (506) an MPLS connectivity request packet for each of the remaining routers identified in the FEC stack. In some examples, after ingress router 12A updates the FEC stack by removing the outermost FEC from the FEC stack, ingress router 12A may determine that the FEC stack is empty ("YES" of step 514), which signals to ingress router 12A that the LSP ping mechanism is complete and connectivity for segment routing LSP associated with the FEC is verified (516). Continuing the example above, ingress router 12A may receive a response from the last router of the FEC stack (e.g., router 12G). Ingress router 12A updates the FEC stack by removing the prefix associated with router 12G, which is the last prefix of the FEC stack. Because the FEC stack is empty, ingress router 12A determines that the LSP ping mechanism is complete and connectivity for segment routing LSP 16 associated with the FEC is verified.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively, or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:
1. A method comprising:
in response to a request to verify connectivity of a segment routing label switched path (LSP), configuring, by an ingress device of the segment routing LSP, a forwarding equivalence class (FEC) stack specifying a stack of segment routing labels for the segment routing LSP, wherein the FEC stack comprises information identifying one or more devices operating as segment endpoints along the segment routing LSP to be validated; and for each of the one or more devices identified from the FEC stack:
  generating, by the ingress device, a respective Multiprotocol Label Switching (MPLS) connectivity request packet for a respective device of the one or more devices, wherein the respective device is identified from an outermost FEC of the FEC stack;
  sending, by the ingress device, the MPLS connectivity request packet to the respective device;
  receiving, by the ingress device and from the respective device, an MPLS connectivity response packet that verifies connectivity of the respective device for the segment routing LSP; and
  in response to receiving the MPLS connectivity response packet, updating, by the ingress device, the FEC stack by removing the outermost FEC of the FEC stack that identifies the respective device.

2. The method of claim 1,
wherein the one or more devices of the segment routing LSP comprises a first device and a second device,
wherein the FEC stack comprises the outermost FEC identifying the first device and subsequent FEC identifying the second device,
wherein generating the respective MPLS connectivity request packet comprises generating a first MPLS connectivity request packet including the FEC stack and a first label stack to steer the first MPLS connectivity request packet to the first device,
wherein sending the MPLS connectivity request packet to the respective device of the one or more devices comprises sending the first MPLS connectivity request packet to the first device,
wherein receiving the MPLS connectivity response packet that verifies connectivity of the respective device for the segment routing LSP comprises receiving a first MPLS connectivity response packet that verifies connectivity of the first device for the segment routing LSP, and
wherein updating the FEC stack comprises updating the FEC stack by removing the outermost FEC of the FEC stack that identifies the first device, which causes the subsequent FEC to become the outermost FEC of the updated FEC stack.

3. The method of claim 2,
wherein the first label stack comprises a label associated with the outermost FEC of the FEC stack that identifies the first device.

4. The method of claim 2,
wherein generating the respective MPLS connectivity request packet comprises generating a second MPLS connectivity request packet including the updated FEC stack and a second label stack to steer the second MPLS connectivity request packet to the second device,
wherein sending the MPLS connectivity request packet to the respective device of the one or more devices comprises sending the second MPLS connectivity request packet to the second device,
wherein receiving the MPLS connectivity response packet that verifies connectivity of the respective device for the segment routing LSP comprises receiving a second MPLS connectivity response packet that verifies connectivity of the second device for the segment routing LSP, and
wherein updating the FEC stack comprises updating the updated FEC stack by removing the outermost FEC of the updated FEC stack that identifies the second device.

5. The method of claim 4,
wherein the second label stack comprises a first label associated with the outermost FEC of the FEC stack that identifies the first device and a second label associated with the outermost FEC of the updated FEC stack that identifies the second device.

6. The method of claim 1,
wherein the MPLS connectivity request packet comprises an MPLS echo request packet, and
wherein the MPLS connectivity response packet comprises an MPLS echo reply packet.

7. The method of claim 1, wherein the segment routing LSP comprises an inter-domain segment routing LSP, the method further comprising:
receiving, by the ingress device, the segment routing label stack from a controller.

8. The method of claim 1, wherein the segment routing LSP comprises an inter-autonomous system (inter-AS) segment routing LSP, the method further comprising:
receiving, by the ingress device, the segment routing label stack from a controller.

9. An ingress device of a segment routing label switched path (LSP) comprising:
one or more processors operably coupled to a memory, wherein the one or more processors are configured to:
  in response to a request to verify connectivity of the segment routing LSP, configure a forwarding equivalence class (FEC) stack specifying a stack of segment routing labels for the segment routing LSP, wherein the FEC stack comprises information identifying one or more devices operating as segment endpoints along the segment routing LSP; and
  for each of the one or more devices identified from the FEC stack:
    generate a respective Multiprotocol Label Switching (MPLS) connectivity request packet for a respective device of the one or more devices, wherein the respective device is identified from an outermost FEC of the FEC stack;
    send the MPLS connectivity request packet to the respective device;
    receive, from the respective device, an MPLS connectivity response packet that verifies connectivity of the respective device for the segment routing LSP; and
    in response to receiving the MPLS connectivity response packet, update the FEC stack by removing the outermost FEC of the FEC stack that identifies the respective device.

10. The ingress device of claim 9,
wherein the one or more devices of the segment routing LSP comprises a first device and a second device,
wherein the FEC stack comprises the outermost FEC the first device and a subsequent FEC identifying the second device,
where, to generate the respective MPLS connectivity request packet, the one or more processors are further configured to generate a first MPLS connectivity request packet including the FEC stack and a first label stack to steer the first MPLS connectivity request packet to the first device, wherein, to send the MPLS connectivity request packet to the respective device of the one or more devices, the one or more processors are further configured to send the first MPLS connectivity request packet to the first device, wherein, to receive the MPLS connectivity response packet that verifies connectivity of the respective device for the segment routing LSP, the one or more processors are further configured receive a first MPLS connectivity response packet that verifies connectivity of the first device for the segment routing LSP, and wherein, to update the FEC stack, the one or more processors are further configured to update the FEC stack by removing the outermost FEC of the FEC stack that identifies the first device, which causes the subsequent FEC to become the outermost FEC of the updated FEC stack.

11. The ingress device of claim 10,
wherein the first label stack comprises a label associated with the outermost FEC of the FEC stack that identifies the first device.

12. The ingress device of claim 10,
wherein, to generate the respective MPLS connectivity request packet, the one or more processors are further configured to generate a second MPLS connectivity request packet including the updated FEC stack and a second label stack to steer the second MPLS connectivity request packet to the second device, wherein, to send the MPLS connectivity request packet to the respective device of the one or more devices, the one or more processors are further configured to send the second MPLS connectivity request packet to the second device, wherein, to receive the MPLS connectivity response packet that verifies connectivity of the respective device for the segment routing LSP, the one or more processors are further configured to receive a second MPLS connectivity response packet that verifies connectivity of the second device for the segment routing LSP, and wherein, to update the FEC stack, the one or more processors are further configured to update the updated FEC stack by removing the outermost FEC of the updated FEC stack that identifies the second device.

13. The ingress device of claim 9,
wherein the MPLS connectivity request packet comprises an MPLS echo request packet, and
wherein the MPLS connectivity response packet comprises an MPLS echo reply packet.

14. The ingress device of claim 9, wherein the segment routing LSP comprises an inter-domain segment routing LSP, wherein the one or more processors are further configured to:
receive the segment routing label stack from a controller.

15. The ingress device of claim 9, wherein the segment routing LSP comprises an inter-autonomous system (inter-AS) segment routing LSP, wherein the one or more processors are further configured to:
receive the segment routing label stack from a controller.

16. A non-transitory computer-readable medium comprising instructions for causing one or more programmable processors of an ingress device to:
in response to a request to verify connectivity of a segment routing label switched path (LSP), configure a forwarding equivalence class (FEC) stack specifying a stack of segment routing labels for the segment routing LSP, wherein the FEC stack comprises information identifying one or more devices operating as segment endpoints along the segment routing LSP; and for each of the one or more devices identified from the FEC stack:
generate a respective Multiprotocol Label Switching (MPLS) connectivity request packet for a respective device of the one or more devices, wherein the respective device is identified from an outermost FEC of the FEC stack;
send the MPLS connectivity request packet to the respective device;
receive, from the respective device, an MPLS connectivity response packet that verifies connectivity of the respective device for the segment routing LSP; and
in response to receiving the MPLS connectivity response packet, update the FEC stack by removing the outermost FEC of the FEC stack that identifies the respective device.

17. The non-transitory computer-readable medium of claim 16,
wherein the one or more devices of the segment routing LSP comprises a first device and a second device,
wherein the FEC stack comprises the outermost FEC identifying the first device and a subsequent FEC information identifying the second device,
where, to generate the respective MPLS connectivity request packet, the one or more processors are further configured to generate a first MPLS connectivity request packet including the FEC stack and a first label stack to steer the first MPLS connectivity request packet to the first device,
wherein, to send the MPLS connectivity request packet to the respective device of the one or more devices, the one or more processors are further configured to send the first MPLS connectivity request packet to the first device,
wherein, to receive the MPLS connectivity response packet that verifies connectivity of the respective device for the segment routing LSP, the one or more processors are further configured receive a first MPLS connectivity response packet that verifies connectivity of the first device for the segment routing LSP, and
wherein, to update the FEC stack, the one or more processors are further configured to update the FEC stack by removing the outermost FEC of the FEC stack that identifies the first device, wherein the updated FEC stack includes an outermost FEC of the updated FEC stack that identifies the second device.

18. The non-transitory computer readable medium of claim 17,
wherein the first label stack comprises a label associated with the outermost FEC of the FEC stack that identifies the first device.

19. The non-transitory computer readable medium of claim 17,
wherein, to generate the respective MPLS connectivity request packet, the one or more processors are further configured to generate a second MPLS connectivity request packet including the updated FEC stack and a second label stack to steer the second MPLS connectivity request packet to the second device,
wherein, to send the MPLS connectivity request packet to the respective device of the one or more devices, the one or more processors are further configured to send the second MPLS connectivity request packet to the second device, wherein, to receive the MPLS connectivity response packet that verifies connectivity of the respective device for the segment routing LSP, the one or more processors are further configured to receive a second MPLS connectivity response packet that verifies connectivity of the second device for the segment routing LSP, and wherein, to update the FEC stack, the one or more processors are further configured to update the updated FEC stack by removing the outermost FEC information of the updated FEC stack that identifies the second device.

20. The non-transitory computer readable medium of claim 17, wherein the MPLS connectivity request packet comprises an MPLS echo request packet, and wherein the MPLS connectivity response packet comprises an MPLS echo reply packet.

\* \* \* \* \*